L. N. HERRING.
TIRE INFLATOR AND TESTER OR GAGE.
APPLICATION FILED MAY 1, 1920.
1,371,089.
Patented Mar. 8, 1921
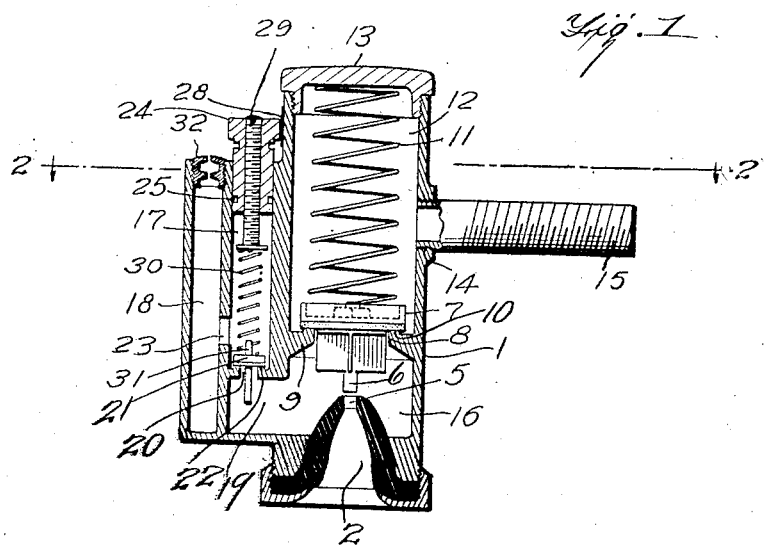
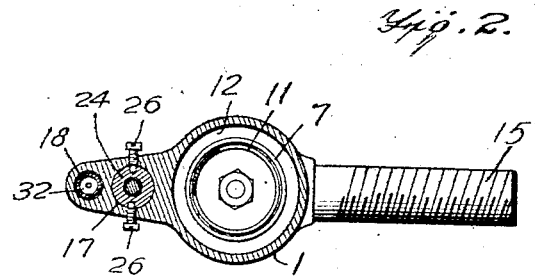
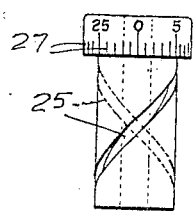
Inventor
LESLIE N. HERRING
By Watson E. Coleman
Attorney

UNITED STATES PATENT OFFICE.

LESLIE N. HERRING, OF MARSHALL, MINNESOTA.

TIRE INFLATOR AND TESTER OR GAGE.

1,371,089.     Specification of Letters Patent.     Patented Mar. 8, 1921.

Application filed May 1, 1920. Serial No. 378,226.

*To all whom it may concern:*

Be it known that I, LESLIE N. HERRING, a citizen of the United States, residing at Marshall, in the county of Lyon and State of Minnesota, have invented certain new and useful Improvements in Tire Inflators and Testers or Gages, of which the following is a specification, reference being had to the accompanying drawings.

This invention relates to an improved tire inflator and tester or gage and an object is to provide a device of this kind by which the tire cannot be inflated with any more air than that which is indicated on the gage or tester, and furthermore, to provide a device which is simple, efficient and practical in construction and capable of being cheaply made and sold at a reasonable profit.

Another object is to provide a device of this kind including a gage having diametrically opposite grooves spirally arranged or rather oppositely inclined and engaged by diametrically opposite set screws so as to hold the gage in different adjusted positions according to the amount of air pressure in the tester, in combination with an adjusted element carried by the gage for governing the tension of the spring of an air check valve, so that the valve may be unseated according to the indication on the gage.

Still another object is the provision of a device of this kind including an audible signal, to notify when the air in the tire reaches the desired pressure.

While the design and construction at present illustrated and set forth is deemed preferable, it is obvious that as a result of a reduction of the invention to a more practical form for commercial purposes, the invention may be susceptible to changes and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view through the improved tire inflator and tester or gage constructed in accordance with the invention showing the inflator as engaging the inflating valve stem of a tire, Fig. 2 is a transverse sectional view on line 2—2 of Fig. 1; and Fig. 3 is a detail view in elevation of the gage sleeve.

Referring more especially to the drawings, 1 designates a casing which is provided with a rubber lined cavity 2 adapted to engage an inflating valve stem of a tire, whereby the end of the stem of the check valve of the inflating valve stem may protrude through an opening 5 of the cavity to engage the valve stem 6 of the valve 7. The stem 6 of the valve 7 is mounted in an opening 8 of a partition wall 9, which has a valve seat 10 to be engaged by the valve 7. An expansible coil spring 11 is mounted in the chamber 12 of the casing 1 to hold the valve 7 normally seated. The upper end of the casing 1 is provided with a cap or closure 13 which is threaded in place. A threaded flanged opening 14 is formed in the wall of the casing 1 so that a tube 15 from any suitable air pump or other supply may be connected. The partition wall 9 divides the casing 1 into two chambers, the chamber 12 and the chamber 16. The casing 1 is provided with auxiliary chambers 17 and 18. The chamber 16 is in communication with a passage 19 which in turn has an opening of communication 20 with the chamber 17. A check valve 21 is mounted in the chamber 17 to coöperate with the valve seat 22 and has its stem engaging through the opening of communication 20 between the passage 19 and the chamber 17.

The chamber 17 has an opening of communication 23 with the chamber 18. An air pressure gage member 24 engages the upper end of the chamber 17 and is provided with diametrically opposite grooves 25, which are inclined in opposite directions and are spirally arranged so as to be engaged by the diametrically opposite set screws 26. These set screws 26 are engaged through the wall of the chamber 17 and may be tightened so as to hold the pressure gage 24 in different adjusted positions according to the pressure to which it may be set. The head of the gage is provided with graduations 27 which may coöperate with an indicator or arrow 28 on the upper end of the wall of the chamber 17. The graduations 27 are designed to indicate different amounts of air pressure to be injected into the tire tube. An elongated adjusting screw 29 is threaded longitudinally through the gage and its inner end is engaged by one end of an expansible coil spring 30. The other end of the coil spring engages the check valve 21 and is in surrounding relation to the short stem 31 of the check valve.

This adjusting screw 29 is provided for the purpose of regulating the tension of the spring according to the various desired air pressures which may be injected into the tire tube. The upper end of the chamber 18 has secured therein a conventional form of audible signal 32 such as a whistle or the like, so that when the desired pressure has been reached in the tire tube, the check valve 21 will become unseated against the action of the spring 30 and the escaping air will pass from the chamber 17 into the chamber 18 by way of the opening 23. The escaping of air from the chamber 18 by way of the audible signal or whistle, will notify the operator that the desired pressure has been reached.

When the combined inflator and tester is applied in order to inflate the tire, and test the pressure, the inflating valve stem will engage in the rubber lined cavity and the end of the stem of the inflating check valve will engage the stem 6 and unseat the valve 7 in which case the air from the pump, not shown, or other supply will enter the chamber 12 and pass through the opening of communication 8 into the chamber 16 and thence into the passage 19 and when the desired pressure is reached, the air will escape through the opening of communication 22, allowing the air to enter the chamber 17 and thence into the chamber 18 where it will blow off and operate the audible signal.

The invention having been set forth, what is claimed as new and useful is:—

1. In an air pressure gage or tester, a casing having a chamber adapted to receive the excessive air pressure, a second chamber having an opening of communication with the first chamber, a check valve controlling the excessive air pressure through said opening of communication, expansible means holding said check valve normally seated, and a gage device coöperating with said expansible spring and adapted to be set to indicate the amount of air pressure in excess of which the check valve is adapted to open, including an air escape opening, said gage device having diametrically oppositely arranged grooves inclined in opposite directions, and a set screw engaging through the wall of the casing and engaging said groove to guide said device in its movement and to hold the same set.

2. In a device as set forth, a casing to engage the inflating valve stem of the tire tube and provided with a stem seat on the interior, a spring tensioned valve to engage said seat and adapted to be unseated by engagement with the inflating valve stem of the tire tube, whereby the tube may be inflated, said casing having a chamber to receive excessive air pressure, a check valve in said chamber to be unseated by the excessive air pressure and including an expansible spring, an air pressure gage device in the upper end of said chamber and having diametrically opposite helical grooves of substantial pitches extending in opposite directions, diametrically opposite adjustable members having extensions engaging said grooves for guiding said gage device when the members are loosened and the gage device is adjusted, the excessive air pressure adapted to unseat the check valve, and adjustable means extending through the gage device and coöperating with the expansible spring to increase or decrease its tension.

3. In a device as set forth, a casing having an inflating valve stem actuated means therein to permit the inflation of the tire tube, an auxiliary chamber having an opening of communication with the interior of said casing, a check valve controlling the air pressure through said opening of communication, a pressure gage device mounted in the upper part of said auxiliary chamber, an expansible spring coöperating with the check valve of said communication, means comprising pin and helical groove connections coöperating with the wall of said chamber and said device to hold the device set according to the pressure desired, the helical groove of said means being of a relatively steep pitch to guide said device, the excessive air pressure adapted to unseat said check valve, the cylindrical surface of the upper end of the gage device having graduations, an indicator on the casing to coöperate with the graduations, and an element adjustable through the gage device and coöperating with the spring to increase or decrease its tension.

In testimony whereof I hereunto affix my signature.

LESLIE N. HERRING